United States Patent [19]

Dagna et al.

[11] Patent Number: 4,503,443

[45] Date of Patent: Mar. 5, 1985

[54] SERIAL INK JET PRINTING HEAD

[75] Inventors: Gian D. Dagna, Ivrea; Mario Buat, Carema, both of Italy

[73] Assignee: Ing. C. Olivetti & C., S.p.A., Ivrea, Italy

[21] Appl. No.: 452,846

[22] Filed: Dec. 23, 1982

[30] Foreign Application Priority Data

Dec. 23, 1981 [IT] Italy .............................. 68663 A/81

[51] Int. Cl.[3] .............................................. G01D 15/16

[52] U.S. Cl. .................................. 346/140 R; 400/126

[58] Field of Search ...................... 346/140 R; 400/126

[56] References Cited

U.S. PATENT DOCUMENTS

| | | | |
|---|---|---|---|
| 4,392,146 | 7/1983 | Bovio | 346/140 |
| 4,412,232 | 10/1983 | Weber | 346/140 |
| 4,432,003 | 2/1984 | Barbero | 346/140 |

*Primary Examiner*—Joseph W. Hartary

*Attorney, Agent, or Firm*—Banner, Birch, McKie & Beckett

[57] ABSTRACT

The head is provided for a conducting ink and comprises a closed container (14) carrying two electrodes and a nozzle (18). The head is removably mounted on a carriage (13) and is replaced when the ink is exhausted.

The container (14) is divided into two cavities (71 and 72) which are in communication by way of an aperture (73, 74, 75) in order to cause ink to flow to the nozzle and to remove bubbles. To ensure that the bubbles do not cause an increase in the pressure in the container, causing the ink to discharge from the nozzle, the container comprises an expansible cavity formed by a bag-type diaphragm (83) and a compression spring (82) which tends to cause expansion of the cavity.

The container is filled with ink, while holding the spring in a compressed condition. As the ink decreases, the spring expands, maintaining a slight depression within the container.

13 Claims, 7 Drawing Figures

SERIAL INK JET PRINTING HEAD

BACKGROUND OF THE INVENTION

The present invention relates to a serial ink jet printing head for liquid, electrically conductive ink, comprising an electrically insulating container for the ink, having a nozzle for the selective discharge of particles on ink, an electrode in contact with the ink and a counter-electrode adjacent to the nozzle, the discharge being caused by an electrical voltage pulse between the counter-electrode and the electrode.

In known printers of the above-indicated type, the container is connected by means of conduits to a larger-capacity tank which is disposed at a certain distance from the printing location. In the case of printers in which the head is mounted on a movable carriage, the tank is disposed on the fixed part of the machine and is connected to the container by way of flexible conduits of substantial length. A pump is required to pass the ink from the tank to the head, so that the printer is expensive to produce and complicated in operation.

SUMMARY OF THE INVENTION

The object of the present invention is to provide an ink jet printing head which does not require a separate tank and which can be easily replaced when the ink is exhausted.

In meeting this object, the invention provides a printing head which is characterised in that the container is closed and comprises means for creating within the container a depression such as to permit the formation of a concave meniscus of ink in the nozzle, until the ink in the container is exhausted.

BRIEF DESCRIPTION OF THE DRAWINGS

The invention will now be described in more detail, by way of example, with reference to the accompanying drawings, in which.

DESCRIPTION OF THE PREFERRED EMBODIMENTS

Figure 1:
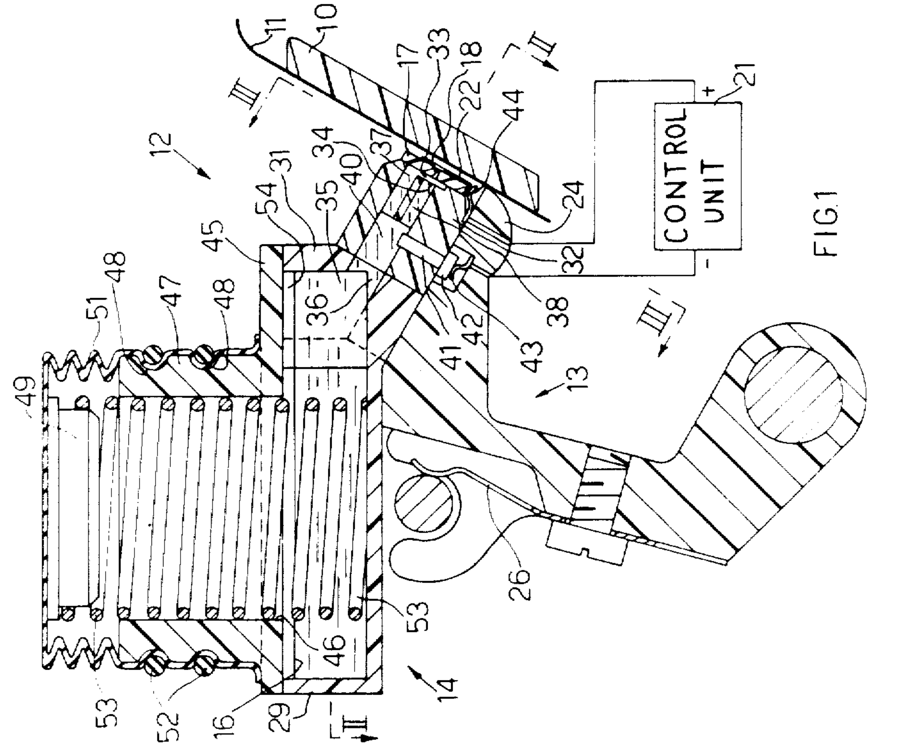
FIG. 1 is a view in longitudinal section of a printer incorporating a printing head in accordance with a first embodiment of the invention.

Referring to FIG. 1, a support bar 10 acts as a platen bar for a sheet of paper 11 which is displaced vertically to permit the printing of dots at successive elementary rows, for example for alphabetic printing in a dot-matrix format.

The printer comprises an ink jet printing head 12 which is mounted on a carriage 13 which is movable transversely with an alternating movement in manner known per se. The head 12 essentially comprises a container 14 of insulating material, for the ink 16 which is electrically conductive. The container 14 is closed towards the support 10 by a plate 17 in which a nozzle 18 is disposed (see FIG. 3), for the discharge of particles of ink 16. The ink is in electrical contact with an electrode 41 which will be seen in greater detail hereinafter, being connected to the outside of the container 14 (see FIG. 1).

The printer comprises an electrical control circuit 21 which is capable of producing a voltage pulse between the electrode and a counter-electrode 22 which is adjacent to the nozzle 18. A state of electrical and thermal excitation is then generated at the meniscus which is formed by the ink 16 in the nozzle 18, such as to cause a plurality of particles of ink to be discharged through the nozzle 18, substantially in the manner described in the U.S. patent application Ser. No. 392,664, assigned to the same assignee as the application.

The carriage 13 (see FIG. 1) substantially corresponds to the carriage indicated at 51 in the above-quoted patent application, and comprises a projection portion 24 by means of which it normally rests against the support 10, under the force of a leaf spring 26.

The container 14 comprises two apertured flange portions 27 (see FIG. 2) for removably connecting it to the carriage 13 by the container 14 has a capacity of about 8–10 $cm^3$ of ink 16 and essentially comprises a rigid box construction 29 of a substantially square base configuration. The box 29 has an appendix portion 31 which is connected to a front closure block member 32 carrying the plate 17. The block member 32 divides the container 14 in such a way as to form a first cavity 33 which is disposed between the plate 17 and a surface 34 of the block member 32, which is parallel to the plate 17. The spacing between the surface 34 and the plate 17 of the same order of magnitude as the thickness of the plate 17. Preferably, that spacing is about 0.4 mm. The block member 32 also forms within the container 14, another cavity 35 which is much larger in capacity than the cavity 33 and which essentially forms the tank for the ink 16.

The portion 31 is provided with an aperture 36 of substantially rectangular shape, which is disposed in line with a cavity 40 in the block member 32, which, by means of three passages in the block member 32, forms a communication between the cavity 33 and the cavity 35. A first passage is formed by an aperture 37 disposed above the nozzle 18 (see FIG. 3), while the other two passages are formed by two conduits 38 and 39 which are disposed in the same horizontal plane parallel to the nozzle 18 and equally spaced therefrom. The conduits 38 and 39 are associated with region (see FIG. 1) of the cavity 10, which is lower than the bottom of the box 29, and thus permits all the ink 16 to pass into the cavity 33. The aperture 37 (see FIG. 3) is oblong and extends at least over a length equal to the distance between the two conduits 38 and 39.

Embedded in a position associated with one of the two conduits 38 and 39 (in FIG. 2, the conduit 38) in the block member 32 is the electrode 41 in the form of a metal stud or pin having a head 42 which is arranged to engage a contact 43 which is fixed on the carriage 13, in turn connected to the negative terminal of the control circuit 21. It will be clear therefore that the electrode 41 remains in contact with the ink 16, substantially until the ink 16 is used up. On the other hand, the counter-electrode 22 engages a contact 44 on the carriage 13, which in turn is connected to the positive terminal of the control circuit 21 (see FIG. 1). The box 29 is closed upwardly by a substantially flat cover 45 which is of insulating material and which is welded or bonded to the edge of the box 29.

The cover 45 is provided in its central part with a circular aperture 46; disposed in line with the circular aperture 46 is a sleeve portion 47 which is provided on its outside with two grooves 48. A disc 49 can be fitted into the sleeve portion 47 and acts as a plug for the box 29 to which it is connected by means of a tubular bag-like diaphragm 51 which is impervious both to air and to the ink 16. The diaphragm 51 is sealingly secured to the sleeve portion 47 by means of two annular rings 52 which are disposed in the groove 48. The disc 49 is urged upwardly by a coil compression spring 53 which permits expansion of the cavity 35, maintaining a certain depression in the cavity.

The head 12 forms an easily replaceable ink cartridge, so that it can be supplied as a disposable ink container. The container 14 of the head 12 is filled up to the level indicated in FIG. 1, and then the diaphragm 51 is fixed to the sleeve portion 47, holding the spring 53 in a compressed condition. The spring 53, when thus compressed, urges the disc 49 upwardly and produces a predetermined depression of the order of 3/100th of an atmosphere (about 3 kPa) in the space above the ink 16. That depression on the one hand permits the ink 16 to form the meniscus within the nozzle 18 at a substantially constant position, while on the other hand it prevents the ink 16 from escaping from the nozzle 18. When the head 12 is mounted on the carriage 13, with the electrode and the counter-electrode 22 being energized with voltage pulses from the circuit 21, a condition of excitation is generated in the nozzle 18, such as to produce a spray of ink particles 16 towards the paper 11, as described in the above-quoted patent application. The flow of electric current in the ink in the nozzle 18 generates in the cavity 33 a series of small bubbles which tend to move upwardly. By way of the aperture 37, the bubbles pass into the cavity 35 and then into the region 54 above the ink, whereby the internal pressure in the region 54 tends to increase gradually. The spring 53 then raises the disc 49, causing an expansion of the volume of the region 54 and thus maintaining a certain depression with the container 14. The magnitude of that depression however gradually decreases down to a value of about 1/100th atmosphere (about 1 kPa).

When the ink in the container 14 is on the point of being used up, it still rises by capillary action in the cavity 33, forming the meniscus 23. When the meniscus 23 of ink is no longer formed, the spring 53 takes up its position of maximum extension. The cartridge 12 is then totally exhausted and must be replaced in order to effect further printing.

Figure 2:
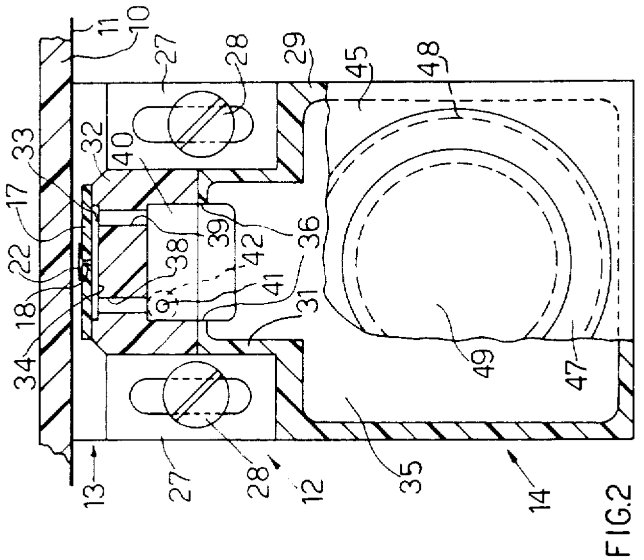
FIG. 2 is a plan view of the printing head partly in section taken along line II—II in FIG. 1.
Figure 3:
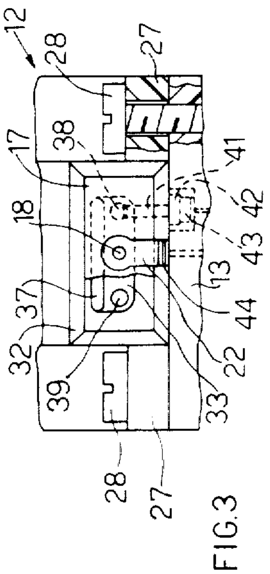
FIG. 3 is a view in partial section taken along line III—III in FIG. 1.

FIGS. 4 to 7 show another embodiment of the invention in which the components generally indicated in the embodiment shown in FIGS. 1 to 3 are denoted by the same reference numeral. The carriage 13 is now formed by a block 56 of insulating plastics material, of substantially prismatic shape. Internally, the block 56 defines a cavity 57 of inverted frustoconical shape with its axis slightly inclined towards the paper 11, relative to the vertical.

The block 56 integrally carries a sleeve portion 59 with a horizontal axis. The block is slidable by means of the sleeve portion 59 on a fixed transverse guide 61. The block 56 also has a recess 62 by means of which it is guided with a great deal of clearance on a second transverse guide 63. A bow-shaped leaf spring 64 tends to cause the block 56 to rotate in a clockwise direction about the guide 61, in a similar manner as described above in relation to the spring 26 shown in FIG. 1. The carriage 13 is displaced transversely in known manner by means of a flexible cable connected to a projection portion 65 on the block 56.

The container 14 of the head 12 is formed by a box structure 66 of non-conducting material which has a substantially rectangular base and a wall portion 67 which is directed towards the paper support, in the form of a pyramid with a sub-horizontal axis, which is inclined with respect to the vertical large base of the pyramid. Provided on the small base of the pyramid is a seat means 68 for accommodating the plate 17 of the nozzle 18. A substantially rectangular recess 69 in the outside surface of the wall portion 67 forms a first cavity 71 of the container, between the plate 17 and the front surface of the recess 69. The thickness of the cavity 71 is of the same order of magnitude as the thickness of the plate 17, preferably 0.4 mm.

The box 66 also forms a second cavity 72 which has a capacity of about 8 $cm^3$ and is therefore much larger than the cavity 71, thus forming the tank for the ink 16. The cavity 72 communicates with the cavity 71 by means of a C-shaped aperture having a horizontal portion 73 (see FIG. 6) above the nozzle 18 and two vertical portions 74 and 75 beside the nozzle 18, the portions 74 and 75 being equally spaced from the nozzle and extending to the lowest point of the cavity 72. In particular, the bottom 76 (see FIG. 4) of the box 66 comprises a portion 77 adjacent to the wall portion 67, which is slightly inclined towards the wall portion 67 to form the above-mentioned lowest point. The horizontal portion 73 of the aperture, which forms a communication between the cavity 71 and the cavity 72, is inclined, at a larger angle than the portion 77, upwardly and towards the centre of the box 66 to promote discharge of the bubbles which are formed during the printing operation.

At the centre, the box 66 carries a small pillar or column 78 which extends over the entire height of the box and which has an axial bore 79. The upper end of the pillar 78 has a transverse recess 80 (see also FIG. 5).

Provided on the underneath surface fothe bottom 76 of the box 66 (see FIG. 1) is a circular seat 81 in which there is disposed a helical compression spring 82, the turns of which progressively decrease in diameter in such a way that, when the spring 82 is totally compressed, all the turns are disposed in the same plane and the spring 82 is contained within the seat 81.

Also fixed in the seat 81 is a flexible diaphragm 83 which is impervious with respect to air and the ink. The diaphragm 83 is of substantially frustoconical shape and has a concertina-like closable side surface. The diaphragm 83 is fixed in position by means of a ring 84 which is welded or bonded to the edge of the seat 81. The diaphragm 83 is of greater thickness at the small base 85 of the conical configuration, whereby the diaphragm is substantially rigid and serves as a support for the spring 82. The diaphragm 83 is capable of forming a cavity 89 which is expandable downwardly and is capable of being accommodated in the cavity 57 in the block 56.

Figure 4:
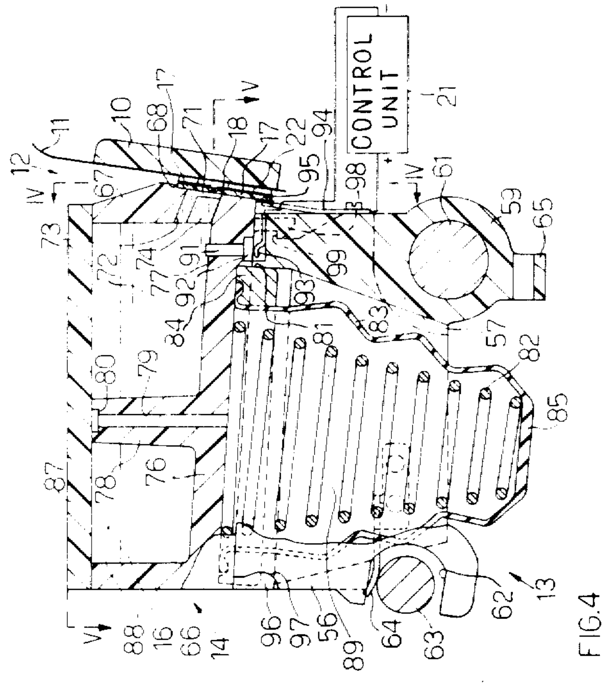
FIG. 4 is a longitudinal section of a printer incorporating a printing head in accordance with another embodiment of the invention.
Figure 5:
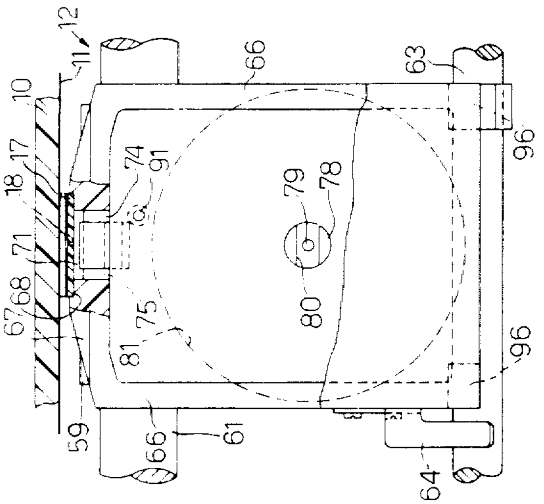
FIG. 5 is a view in horizontal section taken along line V—V in FIG. 4.
Figure 6:
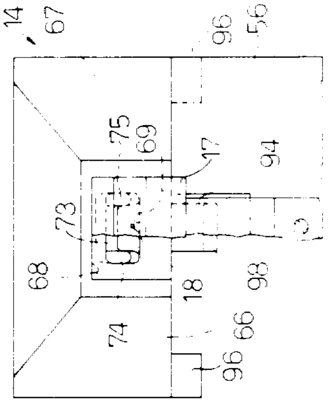
FIG. 6 is a view in section taken along line VI—VI in FIG. 4.
Figure 7:
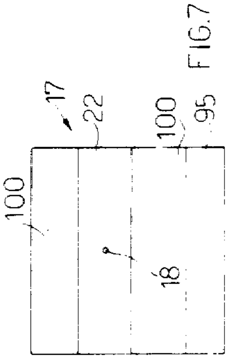
FIG. 7 is a front view on an enlarged scale of the nozzle-bearing plate of the printing head.

The container 14 also has a cover 87 which is welded or bonded to the edge of the box 66 after the box has been filled with ink up to the level indicated in FIG. 4.

The region 88 above the level of ink in the box communicates with the cavity 89 between the bottom 76 of the box 66 and the diaphragm 83 by way of the bore 79 and the recess 80.

In its lower part, the container 14 has an electrode 91 disposed at a position associated with the portion 74 of the aperture between the cavity 71 and the cavity 72, whereby it remains in contact with the ink 16 substantially until the ink is exhausted. An end portion 92 of the electrode 91 extends to the outside of the bottom 76 and is arranged to engage a contact 93 carried by the carriage 13 when the head 12 is mounted thereon.

The carriage 13 also carries a second electrical contact 94 which is arranged to engage the counter-electrode 22 of the head 12. The two contacts 93 and 94 are in turn connected in known manner to the control circuit 21.

For the purposes of mounting the head 12 on the carriage 13, the box 66 carries, in its lower part, two curved projection portions 96 which are arranged to engage into two complementary recesses 97 in the block 56. A latching projection 98 on the box 66 is arranged to engage with a spring action over a shoulder 99 on the block 56.

Finally, the plate 17 is formed of alumina and is 0.2 mm in thickness and is entirely covered over its outside surface and over the lower part 95 of its inside surface, by a layer of conducting material which is applied by the thick film method. When the plate 17 is covered in that manner, it is pierced by a laser beam to produce the nozzle 18 while the layer of conducting material forms the counter-electrode 22. Finally, two strips 100 of an insulating wear-resistant material, for example glass, are applied to the layer 22 on the plate 17. The strips 100 (see FIG. 7) are parallel to the lines of printing on the paper 11 and are about 0.1 mm in thickness in such a way that, by bearing against the paper 11 during the printing operation, they define the spacing between the nozzle 18 and the paper 11, similarly as described above in regard to the projection portions 24 on the carriage 13 shown in FIG. 1. When the plate 17 is prepared in the above-described manner (see FIG. 4), it is welded or bonded to the seat 68 on the wall portion 67 of the box 66.

In a similar manner as described above with regard to the embodiment shown in FIGS. 1 to 3, the box 66 is filled with ink 16 to the level indicated in FIG. 4, and closed, for example by welding the ring 84 in place, holding the spring 82 in a compressed condition. That therefore produces a depression in the cavity 89 and thus, by way of the bore 79 and the recess 80, in the region 88, ensuring that the meniscus is formed in the nozzle 18.

When the box 66 is mounted by a spring latch action on the block 56, the spring 64 causes the strips 100 to bear against the paper 11. When the circuit 21 is selectively energized, a spray of ink for printing a dot is produced by way of the nozzle 18. The small bubbles which are formed as a result of the flow of current are discharged towards the cavity 72 by way of the portion 73 of the aperture. Therefore, in the region 88 and thus also in the cavity 89, the pressure progressively increases, causing the compression spring 82 to extend, which causes expansion of the cavity 89 defined by the diaphragm 83. When the ink 16 is exhausted, the spring 82 is completely extended and the head 12 has to be replaced.

It should be noted that, if any portion of ink 16 passes through the bore 79 into the cavity 89, it cannot return to the nozzle 18, so that it cannot be recovered. In order to avoid ink being drained off in that manner, for example during the storage and transportation operations before the assembly is used on the printer, the cover 87 may be formed with a flexible cover portion (not shown), at the location of the recess 80. The flexible cover portion is caused to adhere to the recess 80 by means of a strip or tongue portion which is stuck to the rigid part of the cover 87, thus preventing the ink from draining away. After the box 66 has been fitted onto the block 56, the strip or tongue portion is pulled off, whereby the flexible cover portion can come out of the recess 80 which then establishes the communication between the region 88 and the cavity 89.

It will be appreciated that various modifications and improvements may be made in the above-described heads, without departing from the scope of the invention. For example, it is possible to provide other systems for removably mounting the head 12 or other means for unsealing the box 66 of a fresh head when it is fitted onto the machine.

Finally, it is possible to provide multiple heads with various containers in various compartments for containing inks of various colours which are to be used alternatively or in combination.

We claim:

1. A serial ink jet printing head for liquid electrically conductive ink, comprising an electrically insulating container (14) for the ink (16), having a nozzle (18) for the selective discharge of particles of ink, an electrode (41;91) in contact with the ink and a counter-electrode (22) adjacent the nozzle, the discharge being caused by an electrical voltage pulse between the counter-electrode and the electrode, an insulating plate (17) carrying said nozzle (18) and closing said container (14) toward the printing support, a first cavity (33;71) disposed between said plate (17) and a surface (34) parallel thereto and having a thickness which is of the same order of magnitude as the plate, a second cavity (35;72) including a flexible diaphragm (51;83) whereby its volume can be expanded upon bubble formation in the ink during operation, and passage means (37, 38, 39; 73, 74, 75) between said first cavity and said second cavity across said surface (34).

2. A head according to claim 1 characterized in that the diaphragm (51; 83) is urged towards the condition of expansion of said volume by a coil compression spring (53; 82) for creating inside the container (14) a depression such as to permit the formation of a concave meniscus of ink in the nozzle (18) until the ink in the container is exhausted.

3. A head according to claim 2, characterized in that said diaphragm (51) connects the body of the container (14) with a rigid closure element (49), said spring (53) being located between the body of the container and said closure element.

4. A head according to claim 3, characterised in that the diaphragm (51) is connected by means of at least one resilient ring (52) to the edge of an aperture in the body of the container (47).

5. A head according to claim 3, characterized in that said closure element (49) is substantially circular and is located on the upper part of the container (14).

6. A head according to claim 2, characterised in that the diaphragm (83) is of a substantially frustoconical shape with a concertina-like closable side surface and a rigid small base (85), and in that the compression spring (82) has a series of turns of progressively decreasing diameter and bears against the said base.

7. A head according to claim 2, characterised in that the diaphragm (83) is fixed to a rigid bottom (76) of the container (14), a conduit (79) between the second cavity (72) and the cavity (89) defined by the diaphragm and the container bottom being provided axially in a rigid column (78) on the said bottom and communicating with the said second cavity (72) by way of an aperture in the top part of the column.

8. A serial ink jet printing head for liquid electrically conductive ink, comprising an electrically insulating container for the ink having a nozzle for the selective discharge of particles of ink, an electrode in contact with the ink and a counter-electrode adjacent the nozzle, the discharge being caused by an electrical voltage pulse between the counter-electrode and the electrode, an insulating plate carrying said nozzle and closing said container toward the printing support, a first cavity disposed between said plate and a surface parallel thereto and having a thickness which is of the same order of magnitude as the plate, a second cavity including a flexible diaphragm whereby its volume can be altered, an aperture (37) disposed above the nozzle (18) and at least a conduit (38 or 39) which is disposed at the location of the lowest point of the second cavity (35) of the container (14).

9. A head according to claim 8, characterised in that at the location of said lowest point a pair of parallel conduits (38, 39) are disposed equally spaced from the nozzle (18), said aperture (37) extending at least over a length equal to the distance between the conduits, the electrode (41) being disposed at the location of one of the conduits (38).

10. A serial ink jet printing head for liquid electrically conductive ink, comprising an electrically insulating container for the ink having a nozzle for the selective discharge of particles of ink, an electrode in contact with the ink and a counter-electrode adjacent the nozzle, the discharge being caused by an electrical voltage pulse between the counter-electrode and the electrode, an insulating plate carrying said nozzle and closing said container toward the printing support, a first cavity disposed between said plate and a surface parallel thereto and having a thickness which is of the same order of magnitude as the plate, a second cavity including a flexible diaphragm whereby its volume can be altered, a C-shaped aperture having a horizontal portion (73) above the nozzle (18) and two vertical portions (74, 75) beside the nozzle and equally spaced therefrom and extending to the lowest point of the second cavity (72), the electrode (91) being disposed at the location of at least one of the vertical portions.

11. A head according to claim 10, wherein the counter-electrode (22) is formed by a conducting material applied to the outside surface of the plate (17) by the thick film method, characterized in that the counter-electrode (22) includes a first thick film layer of a conducting material applied on the entire surface of the plate (17) and bored together with this latter to form said nozzle (18).

12. A head according to claim 11, characterized in that at least a zone of said layer of the plate (27), at a predetermined distance of the nozzle 18, is covered by a wear-resistant material (100) of a thickness such as to define the spacing of the nozzle (18) from the paper, and means for yieldably urging said head to cause said zone to contact said paper.

13. A head according to claim 12, characterized in that said nozzle includes two strips which are parallel to the line of printing and which are equally spaced from the nozzle.

* * * * *